United States Patent [19]
Thomsen

[11] Patent Number: 5,596,498
[45] Date of Patent: Jan. 21, 1997

[54] HYDRAULIC STEERING ARRANGEMENT FOR VEHICLES

[75] Inventor: Svend E. Thomsen, Nordborg, Denmark

[73] Assignee: Danfoss A/S, Nordborg, Denmark

[21] Appl. No.: 563,894

[22] Filed: Nov. 22, 1995

Related U.S. Application Data

[62] Division of Ser. No. 182,132, Jan. 14, 1994, abandoned.

[51] Int. Cl.$^6$ .................................................. B62D 5/093
[52] U.S. Cl. ................................................. 364/424.051
[58] Field of Search .................................. 180/142, 132, 180/143; 60/384, 385, 542; 137/803, 625.66; 91/375 A; 364/424.05

[56] References Cited

U.S. PATENT DOCUMENTS

| | | | |
|---|---|---|---|
| 4,149,384 | 4/1979 | Marshall | 60/542 |
| 4,220,072 | 9/1980 | Numazawa et al. | 91/375 A |
| 4,320,812 | 3/1982 | Takaoka et al. | 180/143 |
| 4,392,540 | 7/1983 | Michio et al. | 180/142 |
| 4,557,342 | 12/1985 | Drutchas | 180/132 |
| 4,640,094 | 2/1987 | Wittren | 60/385 |
| 4,759,182 | 7/1988 | Haarstad | 60/384 |
| 4,862,690 | 9/1969 | Haarstad | 60/384 |
| 4,947,894 | 8/1990 | Obidin | 137/625.66 |
| 4,958,493 | 9/1990 | Schutten | 60/384 |
| 5,020,618 | 6/1991 | Nagao | 180/132 |

*Primary Examiner*—Kevin J. Teska
*Assistant Examiner*—Dan Fiul
*Attorney, Agent, or Firm*—Lee, Mann, Smith, McWilliams, Sweeney & Ohlson

[57] ABSTRACT

A hydraulic steering arrangement for vehicles is proposed, with a steering motor, a flow amplifier in fluid connection therewith, which amplifies a fluid flow measured by a steering measuring device, at least one sensor, which determines a performance characteristic of the vehicle, and a control device, which changes the amount of fluid supplied to the steering motor in dependence on an output signal of the sensor. In a steering arrangement of that kind, it is intended to correct or adapt the steering behavior to the operational status of the vehicle using simple means. For that purpose, the control device changes the amplification factor of the flow amplifier.

20 Claims, 2 Drawing Sheets

HYDRAULIC STEERING ARRANGEMENT FOR VEHICLES

This application is a continuation of application Ser. No. 182,132, filed Jan. 14, 1994, now abandoned.

BACKGROUND OF THE INVENTION

The invention relates to a hydraulic steering arrangement for vehicles, with a steering motor, a flow amplifier in fluid connection therewith, which amplifies a fluid flow measured by a steering measuring device, at least one sensor, which determines a performance characteristic of the vehicle, and a control device, which changes the amount of fluid supplied to the steering motor in dependence on an output signal of the sensor.

A steering arrangement of that kind for a centre-pivot steered vehicle is known from WO 91/01239. In this steering arrangement, a sensor at the steering hand wheel shaft determines steering hand wheel angle and a sensor at the steering motor determines steering motor angle, which are both transmitted to a control arrangement. If the steering handwheel angle does not correspond with the steering motor angle, an error-correcting device that consists of a further pump with series-connected valves is put into operation. Using the error-correcting device the steering motor has additional hydraulic fluid supplied to it or removed from it, so that the position of the steering handwheel and the position of the steered wheels can again be made to coincide with one another. The device also contains a mechanically operated and hydraulically-acting valve mounted on the steering handwheel shaft, which is intended to ensure that a correction can only be carried out when the steering handwheel is operated. With the known arrangement, the performance characteristic of the vehicle can be varied. In particular, errors, which arise, for example, as a result of leakages or non-linearities in the steering arrangement, can be eliminated. The expenditure, however, is relatively high, caused by an additional pump and additional valves and hydraulic hoses, which have to guarantee the connection, inter alia, to the steering motor.

SUMMARY OF THE INVENTION

The invention is based on the problem of achieving, by simple means, a correction or adaptation of the steering behaviour to the operational state of the vehicle.

This problem is solved in a hydraulic steering arrangement of the kind mentioned in the introduction in that the control device changes the amplification factor of the flow amplifier.

Unlike the known steering arrangement, no additional components are required. It is merely necessary to modify the flow amplifier so that the amplification factor is variable. As long as the steering handwheel is not being operated, no hydraulic fluid is conveyed, so that regardless of the magnitude of the amplification factor no correction can be performed. It is thus possible to ensure in a simple manner that a correction is effected only when the vehicle is being steered. Errors that might occur in the known arrangement as the result of an inadvertent actuation of the error-correcting device cannot occur in the steering arrangement according to the invention. The amplification factor of the flow amplifier is variable, that is to say, can be made larger or smaller. In this way it is possible to compensate for errors that have been caused by leakage, and also for errors that occur as a result of non-linearities. In the first instance the amplification factor is increased. In the second instance the amplification factor is changed in the opposite direction to the non-linearities.

In a preferred construction, provision is made for a steering angle sensor, which ascertains steering angle, and a steering handwheel angle sensor, which ascertains steering handwheel angle, to be connected to the control device, the control device changing the amplification factor of the flow amplifier in dependence on a difference between an actual correlation and a desired correlation of steering angle and steering handwheel angle in the direction of a reduction in the difference. The performance characteristic that is affected here is the correlation between the steering handwheel angle and the steering angle.

Furthermore, provision can be made for a speed sensor, which ascertains vehicle speed, to be connected to the control device, the control device changing the amplification factor in dependence on the vehicle speed. The faster the vehicle is travelling, the smaller should the steering changes generally be. The driver can be assisted in that, at relatively high speed, the amplification factor of the flow amplifier is made smaller. In that case, for a change of the steering a correspondingly larger movement of the steering handwheel is required. Conversely, at a low speed or when the vehicle is stationary, the amplification factor of the flow amplifier can be enlarged so that with a relatively small rotation of the steering handwheel a large steering lock is achieved. This assists the driver.

Preferably, the control device changes the desired correlation as a function of the vehicle speed. The control device therefore changes the amplification factor of the flow amplifier indirectly by changing the desired correlation.

Furthermore, in addition to or in place of the sensor, a change-over device for the control device can be provided, with which one of at least two amplification factor ranges can be selected. The driver is able, for example, to choose between a working range and a driving range. In the working range the amplification factor is larger than in the driving range. When sensors are present, no fixed amplification factor is preset, because this is intended to change in dependence on the difference between desired and actual values.

To obtain the variable amplification factor, provision is preferably made for the flow amplifier to have a least one throttling device, the throttle resistance of which can be changed by the control device, the pressure drop across this throttling device determining the amplification factor of the flow amplifier. The change in the amplification factor of a flow amplifier by a variable throttle is known in principle from U.S. Pat. No. 4,914,913. In that case, however, the change in the amplification factor is performed as a function of the rotational speed of the steering handwheel, in that a pressure built up by the rotational speed displaces a valve slide in a bore to a greater or lesser extent, with the result that a throttling point is opened to a greater or lesser extent. A deliberate control of the throttle resistance by a control device is not possible in this particular case.

The throttling device preferably has an electromagnetic valve. Electromagnetic valves are electrically controllable. They can respond to a control device without substantial expenditure being required. The signal transmission paths can be formed by electrical cables which can be laid in the steering arrangement without great technical expertise and without exceptional safety precautions.

It is especially preferable for the electromagnetic valve to be cyclically controlled. A cyclically controlled electromagnetic valve has only two operational positions, namely, a fully opened position and a fully closed position. The actual opening degree of the electromagnetic valve is provided in a time-wise mean by the ratio of the times in which the electromagnetic valve is opened to the sum of the times in which the electromagnetic valve is closed.

Advantageously, a fixed series throttle is connected in series with the electromagnetic valve and a fixed parallel throttle is connected in parallel with the electromagnetic valve. The series throttle restricts the flow through the electromagnetic valve for a case in which the electromagnetic valve provides a block in a fully opened position. The parallel throttle enables a minimum flow to pass through the electromagnetic valve when the electromagnetic valve is intended to provide a block in a closed position.

In an especially preferred construction, two throttling devices are provided, which are connected together in the form of a pressure-divider with a central take-off point, the pressure at the central take-off point determining the amplification factor of the flow amplifier. The pressure across the throttling devices, that is, the pressure at the central take-off point, serves then only as the control pressure. Pressure deviations, which may arise as a result of a larger or smaller volume of the hydraulic fluid, are thereby eliminated.

Advantageously, the flow amplifier has an amplification valve with an amplification slider which forms a first and a second throttling point, the throttling resistance of the first throttling point corresponding to the fluid flow from the steering measuring device, the throttling resistance of the second throttling point being proportional to that of the first throttling point and the amplification slider being acted upon in one direction of movement by a pressure which can be influenced by the throttling device. An amplification valve of this kind is known, for example, from DE 31 46 302 C1. In addition to the known valve, the amplification slider in this particular case is influenced in the pressure chamber at its end face by the pressure at the central take-off point or by the pressure drop across the throttling device.

Advantageously, the electromagnetic valve is installed in the housing of the flow amplifier. This avoids the use of further hydraulic hoses, which involve the risk of rupture. At the same time, the steering arrangement can be constructed very simply. If desired, the new elements of the steering arrangement can be retrofitted in existing steering arrangements.

This is realized in particular in that the amplification slider is arranged in a housing bore that is closed by a cover, the electromagnetic valve being arranged in the cover. By exchanging the cover, that is, a cover without an electromagnetic valve for a cover with an electromagnetic valve, retrofitting can be carried out without problems.

In a further preferred construction, a further housing bore, which is likewise closed by the cover, has arranged in it a priority slider of a priority valve, and a path that can be unblocked by the electromagnetic valve is arranged in the cover between the two valves. This provides an additional connection between the two valves, which serves exclusively for pressure control of the valves.

It is then preferable for the path to connect respective pressure chambers arranged end face on, bounded by the relevant slider, of the amplification valve and the priority valve with one another. The pressure in the respective pressure chambers is a key influencing variable for the position of the individual sliders and thus for the amount of hydraulic fluid flowing through the valves.

In a further construction, a second path, which can be unblocked by the second electromagnetic valve, can also be provided in the cover, and opens into a duct connected to the output of the amplification valve. With the exception of the duct connected to the output, the pressure-divider and the paths connected to it can be concentrated in the cover.

The feature of arranging the respective series throttles in the cover also serves this purpose. Additional measures in the housing of the flow amplifier are not necessary.

In order to avoid further changes to the housing of the flow amplifier, a preferred construction provides for the parallel throttle for the first throttling device to be arranged in the amplification slider. This can be achieved in particular if the fluid path from the priority valve into the pressure chamber of the amplification valve runs through the amplification slider.

The parallel throttle for the second throttling device is advantageously formed by a bushing arranged in the duct, the bushing have a radial throttling bore which opens into an annular groove connected to the pressure chamber of the amplification valve. A bushing of this kind can easily be retrofitted into existing flow amplifiers.

BRIEF DESCRIPTION OF THE DRAWINGS

The invention is described hereinafter with reference to a preferred embodiment, in conjunction with the drawing, in which.

DESCRIPTION OF THE PREFERRED EMBODIMENTS

Figure 1:
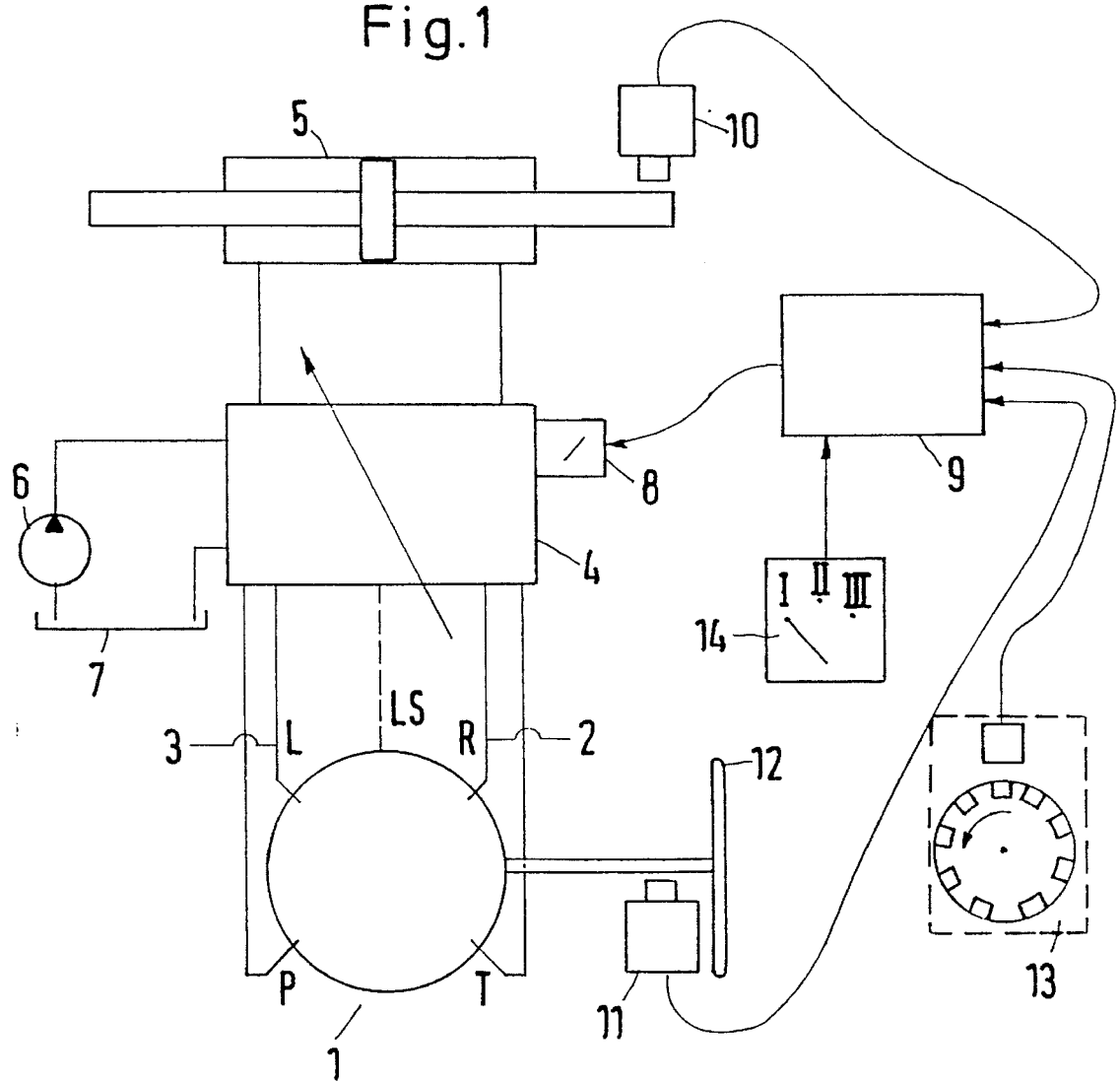
FIG. 1 shows a schematic sketch of the steering arrangement.

A hydraulic steering arrangement illustrated in FIG. 1 comprises a hydraulic steering measuring device 1, which at its outputs 2, 3 delivers or receives a flow of fluid which is dependent on the magnitude and the direction of the rotation of a steering handwheel 12. The fluid flow is conveyed to a flow amplifier 4 which is connected to a steering motor 5. The flow amplifier 4 is supplied by a pump 6 with hydraulic oil from a tank 7. An amount of hydraulic oil that corresponds to a multiple of the amount measured by the steering measuring device 1 is conveyed by the flow amplifier 4 to the steering motor 5. If, for example, the steering measuring device 1 generates a displacement of 160 cm$^3$ per steering handwheel rotation, and if the flow amplifier 4 has an amplification factor of 5, then an amount of 800 cm$^3$ of hydraulic oil per steering handwheel rotation is conveyed to the steering motor 5.

The amplification factor of the flow amplifier 4 is, however, not constant. On the contrary, it can be altered with an electromagnetic valve arrangement 8 that is controlled by a control device 9.

Hydraulic oil is conveyed to the steering measuring device 1 by way of a connection P. Returning hydraulic oil is discharged by way of a connection T to the tank. A connection LS is provided for control of a priority valve 21 (FIG. 3) incorporated in the flow amplifier.

The control device 9 is connected to a steering motor angle sensor 10 and to a steering handwheel angle sensor 11 and also to a vehicle speed sensor 13 and a change-over switch 14. From the output signals of the steering motor angle sensor 10 and the steering handwheel angle sensor 11 the control device 9 forms the actual correlation between the steering handwheel angle and the steering motor angle and compares this actual correlation with a predetermined desired correlation. If the actual correlation does not correspond with the desired correlation, which can be caused, for example, by a leakage or a non-linearity in the steering arrangement, the amplification factor of the flow amplifier 4 is changed. If, for example, at a set steering handwheel angle the actual steering motor angle lags behind the predetermined steering motor angle, the amplification factor of the flow amplifier 4 is increased. An increased amount of hydraulic oil is therefore conveyed to the steering motor 5. The steering motor angle can thus be brought to its desired value again. If, in another case, for example, because of a non-linearity in the steering arrangement, the actual steering motor angle has overtaken a set steering handwheel angle, the amplification factor of the flow amplifier 4 is reduced, so that in this case too the actual steering motor angle corresponds to the predetermined steering motor angle. The correction is only effected when oil is flowing to the steering motor 5, that is to say, during steering. The driver of the vehicle will therefore not notice the correction. It is ensured that the steering motor 5 cannot be actuated by an inadvertent wrong operation of the control device 9 even though the driver is intending not to steer.

The change in the amplification factor of the flow amplifier 4 can be performed also or additionally in dependence on speed. For that purpose, the control device 9 evaluates the output signal of the vehicle speed sensor 13. For example, the amplification factor or the amplification factor range can be reduced at relatively high vehicle speeds. For a predetermined steering lock, a relatively large rotation of the steering handwheel is then required. Such a performance characteristic is desirable, since violent steering movements should, if possible, be avoided at high speeds.

Instead of changing the amplification factor of the flow amplifier 4 directly, the output signal of the vehicle speed sensor 13 can also be used to change the desired correlation between steering motor angle and steering handwheel angle in the control device 9. The change in the amplification factor is then brought about by the regulation in the control device 9. Furthermore, with the aid of the change-over switch 14 the driver is able to select different amplification factor ranges I, II, III, for example, for heavy work, for light work and for road travel. In the case of heavy work, very small steering handwheel rotations are then sufficient to achieve a large steering lock. In the case of road use, relatively large steering handwheel rotations are necessary for relatively small steering locks. In the case of light work, the ratio is somewhere in between. Here too, provision can be made for the desired correlation to be changed with the help of the change-over switch 14. All three possibilities, that is, the compensation of leakages and non-linearities with the aid of the sensors 10, 11 for steering motor angle and steering handwheel angle, the speed-dependent control by the vehicle speed sensor 13 and the change-over of ranges with the aid of the change-over switch 14 exert an influence of the steering behaviour in dependence on the performance characteristic of the vehicle. They can be used alone or in combination with one another. Further criteria for influencing the steering behaviour by changing the amplification factor of the flow amplifier 4 can be, for example, the vehicle weight, external conditions, such as temperature or wind speed, travel direction or vehicle inclination.

Figure 2:
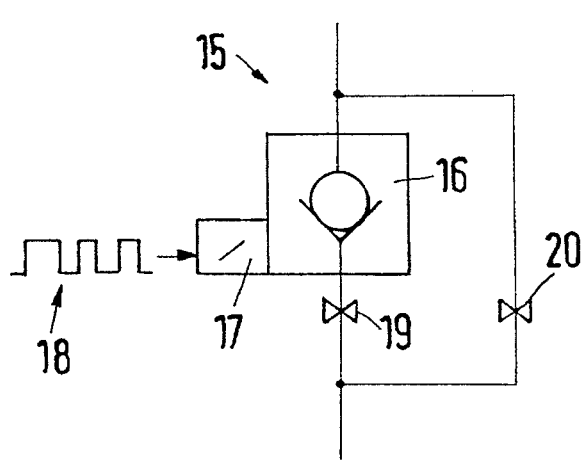
FIG. 2 shows a schematic sketch of a throttling device.

FIG. 2 shows a controlled throttling device 15, as used in the electromagnetic valve arrangement 8 for changing the amplification factor of the flow amplifier 4. The throttling device 15 has an electromagnetic valve 16 which is supplied from the control device 9 by way of a control input 17 with a current in the form of a sequence of square-wave pulses 18. When the current is at its maximum value, the electromagnetic valve 16 is fully opened. When the current is at its minimum value, the electromagnetic valve 16 is fully closed. This control behaviour is, however, dependent on type; the case illustrated is that of a normally closed valve. In a normally open valve, the behaviour is exactly the reverse, that is to say, it closes when supplied with current. The electromagnetic valve in this case is a cyclically controlled electromagnetic valve. The opening degree averaged in respect of time of the electromagnetic valve 16 is obtained from the duty factor of the square-wave pulses 18, that is, from the ratio of the times in which the current has its maximum value to the cycle lengths.

A series throttle 19 is arranged in series with the electromagnetic valve 16. A parallel throttle 20 is arranged parallel with the electromagnetic valve 16. The throttles 19 and 20 are set to a fixed value. The series throttle 19 restricts the flow through the throttling device 15 when the electromagnetic valve 16 provides a block in the fully opened position in the event of a failure. The parallel throttle 20 allows a minimum flow through the throttling device 15 when the electromagnetic valve 16 provides a block in the fully closed position.

In a housing 22 the flow amplifier 4 includes, inter alia, the priority valve 22 with a priority slider 23 and an amplification valve 24 with an amplification slider 25. A directional valve, not illustrated, can also be arranged in the same housing 22. The function of the priority valve 21, which transmits a flow 26 to a load outflow 27 whenever there is no requirement at a steering outflow 28, is well known. Refer, for example, to DE 31 46 302 C1 or DE 29 32 847 C2. The function of the amplification slider 25, which has bores 29, 30', 31 forming throttling points together with annular grooves 32, 33, 34, is also known from these two publications. Bores 30, which serve to amplify the flow, are also provided. Here, acting in a first pressure chamber 35 is a pressure dependent on a flow q generated by the steering measuring device 1 and on the throttling resistance between the bore 30 and the annular groove 33; this pressure displaces the amplification slider 25 to the left (FIG. 3), with the result that throttling points 29, 32 and 30, 33 open correspondingly. The throttling resistance 31, 34 is of virtually no importance. A flow Q sets in, which is proportional to the flow q generated by the steering measuring device. On the side of the amplification slider 25 opposite to the first pressure chamber, there is a second pressure chamber 36, in which additionally a compression spring 37 acting on the amplification slider 25 is arranged. This spring is not shown in FIG. 3 for reasons of clarity. The priority valve 21 has a third pressure chamber 38. The priority slider 23 is loaded on the opposing side by a spring 39.

The steering outflow 28 is connected by way of a non-return valve 41 and a fixed throttle D5 to the second pressure chamber 36 of the amplification valve 24. This second pressure chamber 36 is connected by way of a path 40 to the third pressure chamber of the priority valve 21. A fixed throttle D1 and an electromagnetic valve MV1 are arranged in series in this path. The third pressure chamber 38 is connected by way of a path to the steering outflow 28 of the priority valve. The path LS (FIG. 1.) opens into the opposing pressure chamber of the priority valve 21 (not illustrated).

The second pressure chamber 36 of the amplification valve 24 is connected by way of a path 42 to the annular groove 33 forming the output of the amplification valve 24. A second electromagnetic valve MV2 and a fixed throttle D2 are arranged in series in this path 42. The second pressure chamber 36 is also connected to the annular groove 33 by way of a fixed throttle D20.

Figure 3:
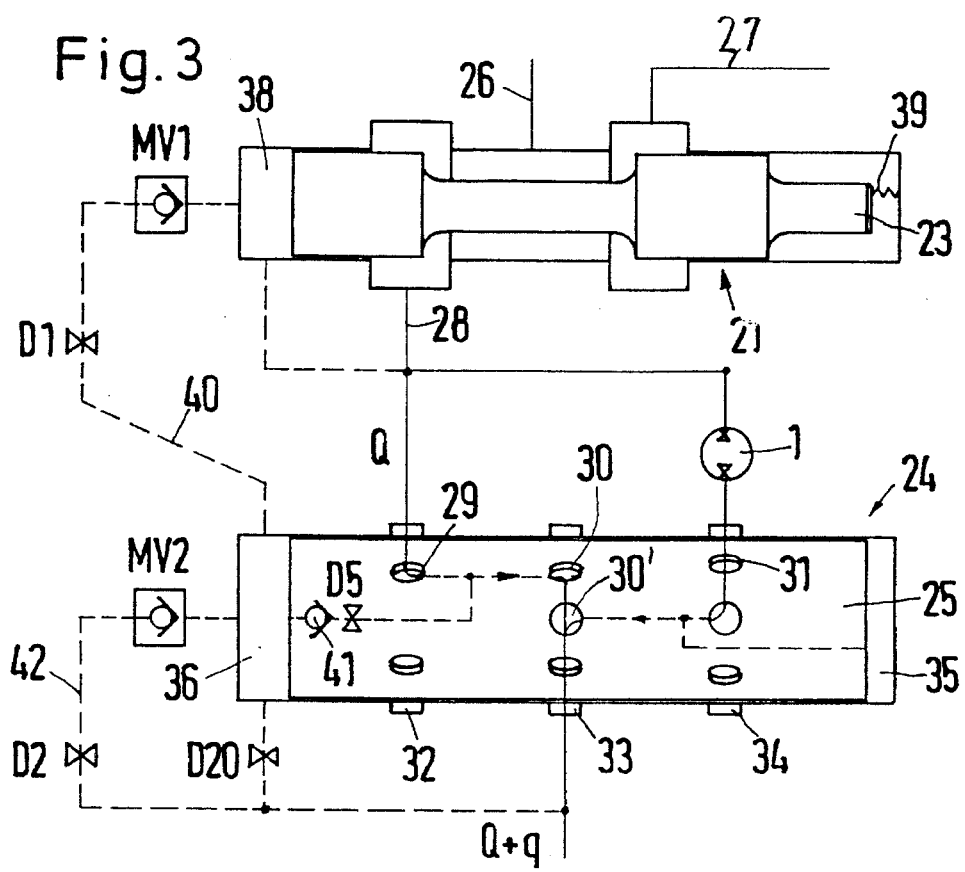
FIG. 3 shows the basic arrangement of the throttling devices and FIG. 4 shows a fragment of a flow amplifier for illustrating the arrangement of the throttling devices.

As is readily apparent from FIG. 3, the throttle D1 forms a series throttle with respect to the electromagnetic valve MV1, while the throttle D5 forms a parallel throttle with respect to the electromagnetic valve MV1. Similarly, the throttle D2 forms a series throttle with respect to the electromagnetic valve MV2, while the throttle D20 forms a parallel throttle with respect to the electromagnetic valve MV2.

The electromagnetic valves MV1, MV2 correspond to the electromagnetic valves 16 in FIG. 2. Similarly, the series throttles D1, D2 correspond to the series throttle 19, and the parallel throttles D5, D20 correspond to the parallel throttle 20 of FIG. 2.

The electromagnetic valves MV1 and MV2 form a pressure-divider, the central take-off point of which is located in the second pressure chamber 36 of the amplification valve 24. The position of the amplification slider 25, which would otherwise only be set by the pressure difference caused by the flow q at the throttle point 30', 33 on the one side and by the pressure difference caused by the flow Q at the throttle point 29, 32, is changed with the help of the pressure at the central take-off point. The amplification ratio, which is determined by the amplification slider 25, therefore changes as well, however. If, for example, the electromagnetic valve MV2 is opened, the pressure in the second pressure chamber 36 drops, and the amplification slider 25 moves to the left. This increases the flow Q. The amplification increases. If, conversely, the electromagnetic valve MV1 is opened further, the pressure in the second pressure chamber 36 increases. The amplification slider 25 is displaced to the right. The flow Q is throttled more strongly. The amplification decreases.

Figure 4:
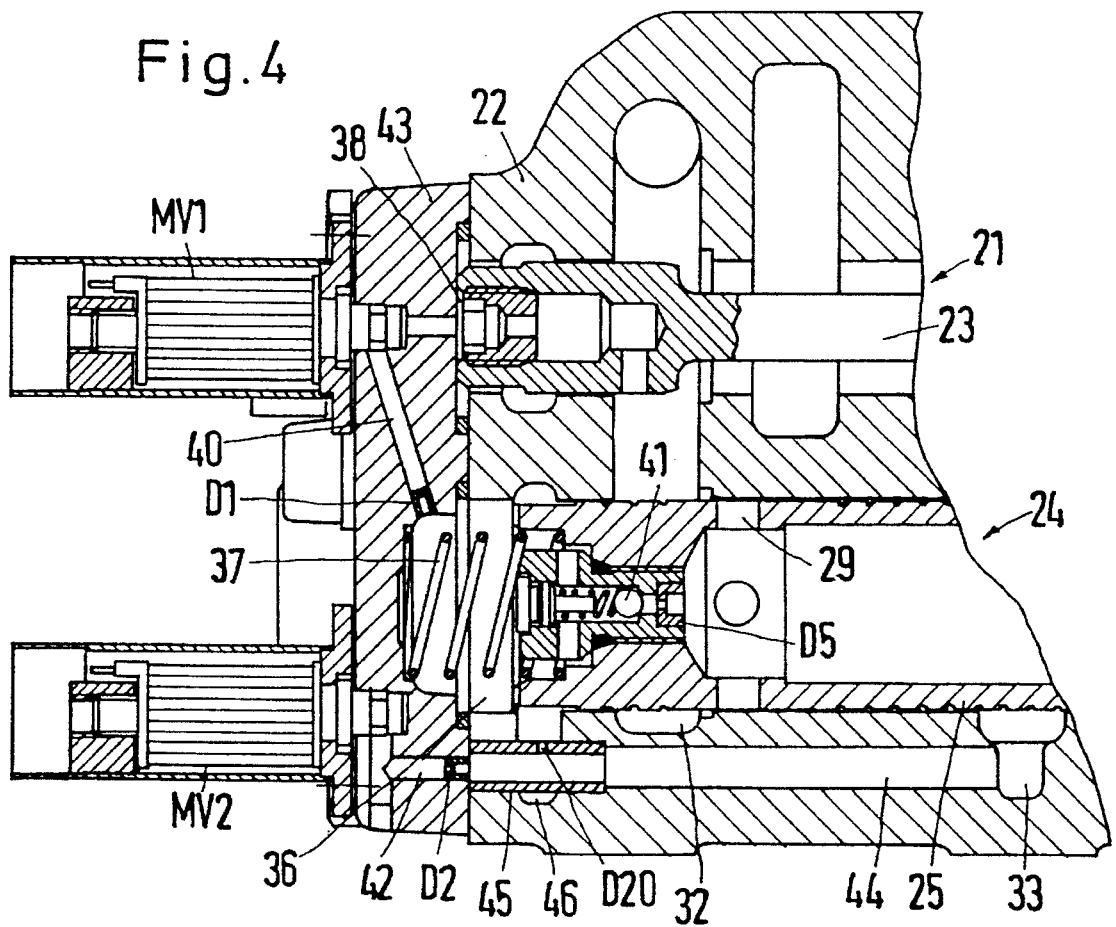

FIG. 4 illustrates the mechanical construction of the flow amplifier 4, in so far as it is of interest for the installation of the pressure-divider formed by the electromagnetic valves MV1, MV2. The two electromagnetic valves MV1, MV2 are arranged in a cover 43 which covers the bores receiving the amplification slider 25 and the priority slider 23. The paths 40, 42 are, exactly like the series throttles D1, D2, arranged in the cover. A duct 44, which connects the series throttle D2 with the annular groove 33, and a bushing 45 with a radial bore D20 which forms the parallel throttle for the electromagnetic valve MV2, are provided in the housing 22 of the flow amplifier. The radial bore D20 is connected to an annular groove 46 which in its turn is in fluid connection with the pressure chamber 36. Existing flow amplifiers can be converted with this construction so that their amplification factor is rendered variable. Basically, only the cover 43 needs to be exchanged for that purpose. A bushing 45 must be incorporated and a throttle insert forming the throttle D5 must be incorporated in the housing of the non-return valve 41, or at a point of identical function of the amplification slider 25. All alterations can be performed without problems.

I claim:

1. A hydraulic steering arrangement for vehicles comprising a fluid-activated steering motor, a flow amplifier in fluid connection therewith, and a steering measuring device for measuring fluid flow, said steering measuring device being in fluid connection with said flow amplifier, said amplifier including means to amplify the fluid flow measured by said steering measuring device, at least one sensor, said sensor including means to determine a performance characteristic of the vehicle, and a control device, said sensor being connected to said control device and said control device including means to change the amount of fluid supplied by the flow amplifier to the steering motor in dependence on an output signal of the sensor, said flow amplifier having a variable amplification factor, and said control device including means to change said amplification factor of the flow amplifier.

2. A steering arrangement according to claim 1, in which a steering angle sensor, which ascertains steering angle, and a steering handwheel angle sensor, which ascertains steering handwheel angle, are connected to the control device, the control device changing the amplification factor of the flow amplifier in dependence on a difference between an actual correlation and a desired correlation of steering angle and steering handwheel angle, said changing being in the direction of a reduction in the difference.

3. A steering arrangement according to claim 2, in which a speed sensor, which ascertains a vehicle speed, is connected to the control device, the control device changing the amplification factor in dependence on the vehicle speed.

4. A steering arrangement according to claim 3, in which the control device changes the desired correlation as a function of the vehicle speed.

5. A steering arrangement according to claim 1, including a change-over device for the control device, said change-over device including means to select one of at least two amplification factor ranges.

6. A steering arrangement according to claim 1, in which the flow amplifier has at least one throttling device, said throttling device having a throttle resistance which can be changed by the control device, pressure drop across this throttling device determining the amplification factor of the flow amplifier.

7. A steering arrangement according to claim 6, in which the throttling device includes an electromagnetic valve.

8. A steering arrangement according to claim 7, in which the electromagnetic valve is cyclically controlled.

9. A steering arrangement according to claim 7, in which a fixed series throttle is connected in series with the electromagnetic valve and a fixed parallel throttle is connected in parallel with the electromagnetic valve.

10. A steering arrangement according to claim 6 including two throttling devices, said throttling devices being connected together in the form of a pressure-divider with a central take-off point, pressure at the central take-off point determining the amplification factor of the flow amplifier.

11. A steering arrangement according to claim 6, in which the flow amplifier includes an amplification valve with an amplification slider which forms a first and a second throttling point, throttling resistance of the first throttling point corresponding to the fluid flow from the steering measuring device, throttling resistance of the second throttling point being proportional to that of the first throttling point and the amplification slider being acted upon in one direction of movement by a pressure which can be influenced by the throttling device.

12. A steering arrangement according to claim 7 in which the electromagnetic valve is installed in a housing of the flow amplifier.

13. A steering arrangement according to claim 11, in which the amplification slider is arranged in a housing bore that is closed by a cover, the electromagnetic valve being arranged in the cover.

14. A steering arrangement according to claim 13, in which a further housing bore, which is closed by the cover, has arranged in it a priority slider of a priority valve, and a path that can be unblocked by the electromagnetic valve is arranged in the cover between the two valves.

15. A steering arrangement according to claim 14, in which the path connects respective pressure chambers arranged end face to end face, said faces being bounded by a slider of the amplification valve and the priority valve.

16. A steering arrangement according to claim 15, in which a second path, formed to be unblocked by the second electromagnetic valve, is provided in the cover, said second path opening into a duct connected to the output of the amplification valve.

17. A steering arrangement according to claim 13, in which the throttling device is arranged in the cover.

18. A steering arrangement according to claim 13, in which the parallel throttle for the first throttling device is arranged in the amplification slider.

19. A steering arrangement according to claim 11 including two throttling devices, said throttling devices being connected together in the form of a pressure-divider with a central take-off point, pressure at the central take-off point determining the amplification factor of the flow amplifier.

20. A steering arrangement according to claim 16, in which the parallel throttle for the second throttling device is formed by a bushing arranged in the duct, the bushing having a radial throttling bore which opens into an annular groove connected to the pressure chamber of the amplification valve.

* * * * *